(12) United States Patent
Yamaguchi

(10) Patent No.: US 7,279,650 B2
(45) Date of Patent: Oct. 9, 2007

(54) ELECTRONIC APPARATUS HAVING ILLUMINATION BUTTON

(75) Inventor: Toshinobu Yamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/697,148

(22) Filed: Apr. 5, 2007

(65) Prior Publication Data

US 2007/0187219 A1    Aug. 16, 2007

Related U.S. Application Data

(62) Division of application No. 11/231,012, filed on Sep. 20, 2005, now Pat. No. 7,214,896.

(30) Foreign Application Priority Data

Sep. 29, 2004    (JP) .............................. 2004-284345

(51) Int. Cl.
 *H01H 9/00*    (2006.01)
(52) U.S. Cl. ...................... 200/314; 200/341
(58) Field of Classification Search ........ 200/310–314, 200/341–345
 See application file for complete search history.

(56) References Cited

U.S. PATENT DOCUMENTS

| | | | |
|---|---|---|---|
| 4,924,044 A | 5/1990 | Takahashi et al. | |
| 4,947,461 A | 8/1990 | Yoshioka et al. | |
| 5,304,764 A | 4/1994 | Kobayashi | |
| 5,343,008 A * | 8/1994 | Ipcinski | 200/302.2 |
| 5,401,927 A | 3/1995 | Lundell et al. | |
| 5,471,023 A | 11/1995 | Kaizu et al. | |
| 6,271,491 B1 * | 8/2001 | Ono et al. | 200/520 |
| 6,603,083 B2 | 8/2003 | Amari et al. | |
| 6,635,838 B1 * | 10/2003 | Kornelson | 200/341 |
| 6,680,676 B1 * | 1/2004 | Hayashi et al. | 341/22 |
| 6,720,892 B1 | 4/2004 | Lachor | |
| 6,906,274 B2 * | 6/2005 | Ito et al. | 200/512 |
| 6,933,454 B2 | 8/2005 | Ishibashi et al. | |
| 7,012,208 B2 * | 3/2006 | Wang | 200/341 |
| 7,098,411 B1 * | 8/2006 | McConnell et al. | 200/5 R |
| 7,109,431 B2 * | 9/2006 | Yanai et al. | 200/512 |
| 7,126,072 B2 * | 10/2006 | Saitoh | 200/512 |
| 7,129,432 B2 * | 10/2006 | Fujii et al. | 200/314 |
| 7,164,092 B2 * | 1/2007 | Kawano | 200/310 |
| 7,193,170 B2 * | 3/2007 | Katayama et al. | 200/314 |
| 2003/0132093 A1 * | 7/2003 | Huang | 200/314 |
| 2005/0061645 A1 | 3/2005 | Ishibashi et al. | |
| 2005/0150753 A1 * | 7/2005 | Hsu | 200/314 |
| 2005/0167254 A1 * | 8/2005 | Oosawa | 200/314 |
| 2005/0189205 A1 * | 9/2005 | Fujii et al. | 200/314 |
| 2005/0194241 A1 * | 9/2005 | Kim | 200/314 |
| 2005/0274593 A1 | 12/2005 | Kawano | |

* cited by examiner

*Primary Examiner*—Elvin Enad
*Assistant Examiner*—Lisa Klaus
(74) *Attorney, Agent, or Firm*—Canon U.S.A. Inc IP Divsion

(57) ABSTRACT

An electronic apparatus with an illuminated button, the apparatus comprising a first operation button, a second operation button, a first board mounted with a first switch corresponding to the first operation button, wherein a portion of the first board is notched, a second switch corresponding to the second operation button, wherein the second switch is mounted below the notched portion of the first board, and a light source that is mounted below the second operation button.

4 Claims, 4 Drawing Sheets

ELECTRONIC APPARATUS HAVING ILLUMINATION BUTTON

CROSS REFERENCE TO RELATED APPLICATIONS

The present application is a divisional of U.S. patent application Ser. No. 11/231,012, filed Sep. 20, 2005, now U.S. Pat. No. 7,214,896 entitled "ELECTRONIC APPARATUS HAVING ILLUMINATION BUTTON", the content of which is expressly incorporated by reference herein in its entirety. Further, the present application claims priority from Japanese Patent Application No. 2004-284345, filed Sep. 29, 2004, which is also hereby incorporated by reference herein in its entirety.

BACKGROUND OF THE INVENTION

1. Field of the Invention

The present invention relates to an operation button to be illuminated of an electronic apparatus.

2. Description of the Related Art

An electronic apparatus, such as digital camera, is often configured so that the operation buttons are all disposed on one face of the apparatus, and their associated switches are disposed on a single flexible board or a print board.

Moreover, for a purpose of distinguishing buttons or identifying a button that indicates a specific function, a surface of the operation button is illuminated using a light source such as LED, which is emitted from the rear side of the button.

The light source and the switch cannot both be placed right below the button. With regard to their positions, if the light source is not located in the center of the button, the button will not be evenly or efficiently illuminated. On the other hand, if the switch is not located in the center of the button, a satisfactory feeling of the button clicking cannot be obtained.

With the advancement in recent years of the technology for producing thin electronic apparatuses, a space between the button and the light source or the switch is becoming smaller, and the above described problem is becoming more prominent.

In small electronic apparatuses in recent years, if possible, the operation buttons tend to be situated in one place. The switches are frequently arranged on the flexible board or the print board, and disposed within a small space below a cover. In such a device, if a part of the operation buttons is configured to be illuminated, unevenness of illumination can easily occur if the LED is not located in the center of the button due to a space between the buttons, and because the board or flexible board on which the LED or the switches are mounted is so narrow. Moreover, there is a problem in that the amount of light decreases if the light originates from a light source placed away from the button. Moreover, because the tactile switch is thin, it has to be mounted on the large area so that the LED or the switch must be placed away from the center of the button.

SUMMARY OF THE INVENTION

One aspect of the present invention is directed to providing a structure when a plurality of operation members, including an illumination type operation member, is closely positioned.

In one aspect of the present invention, an electronic apparatus includes a first operation button, a second operation button, a first board mounted with a first switch corresponding to the first operation button, wherein a portion of the first board, a second switch corresponding to the second operation button, wherein the second switch is mounted below the notched portion of the first board, and a light source mounted below the second operation button.

In another aspect of the present invention, an image capture device includes an image capture unit, a display unit that displays am image obtained from the image capture unit, wherein the display unit is mounted on a first side of a rear portion of the image capture unit, a first operation button mounted on a second rear portion located opposite to the first rear side, a second operation button mounted on the second rear side located opposite to the first rear side, a first board mounted with a first switch corresponding to the first operation button, wherein the first board is notched in part, a second switch corresponding to the second operation button, mounted below the notched portion of the first board, and a light source mounted below the second operation button.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Exemplary Embodiment

Figure 1:
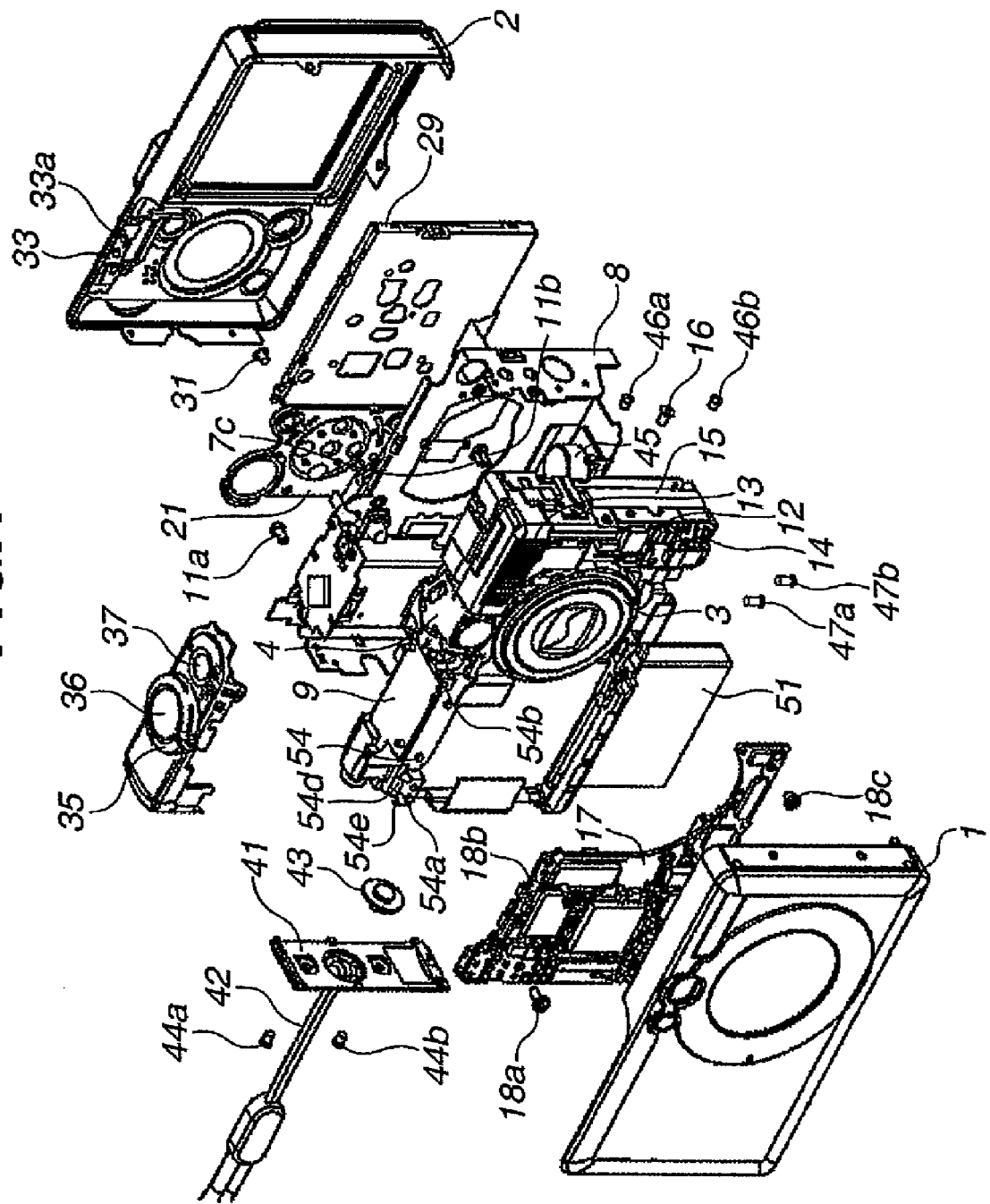
FIG. 1 is an exploded perspective view showing a camera according to a first embodiment of the present invention viewed from the front side.
Figure 2:
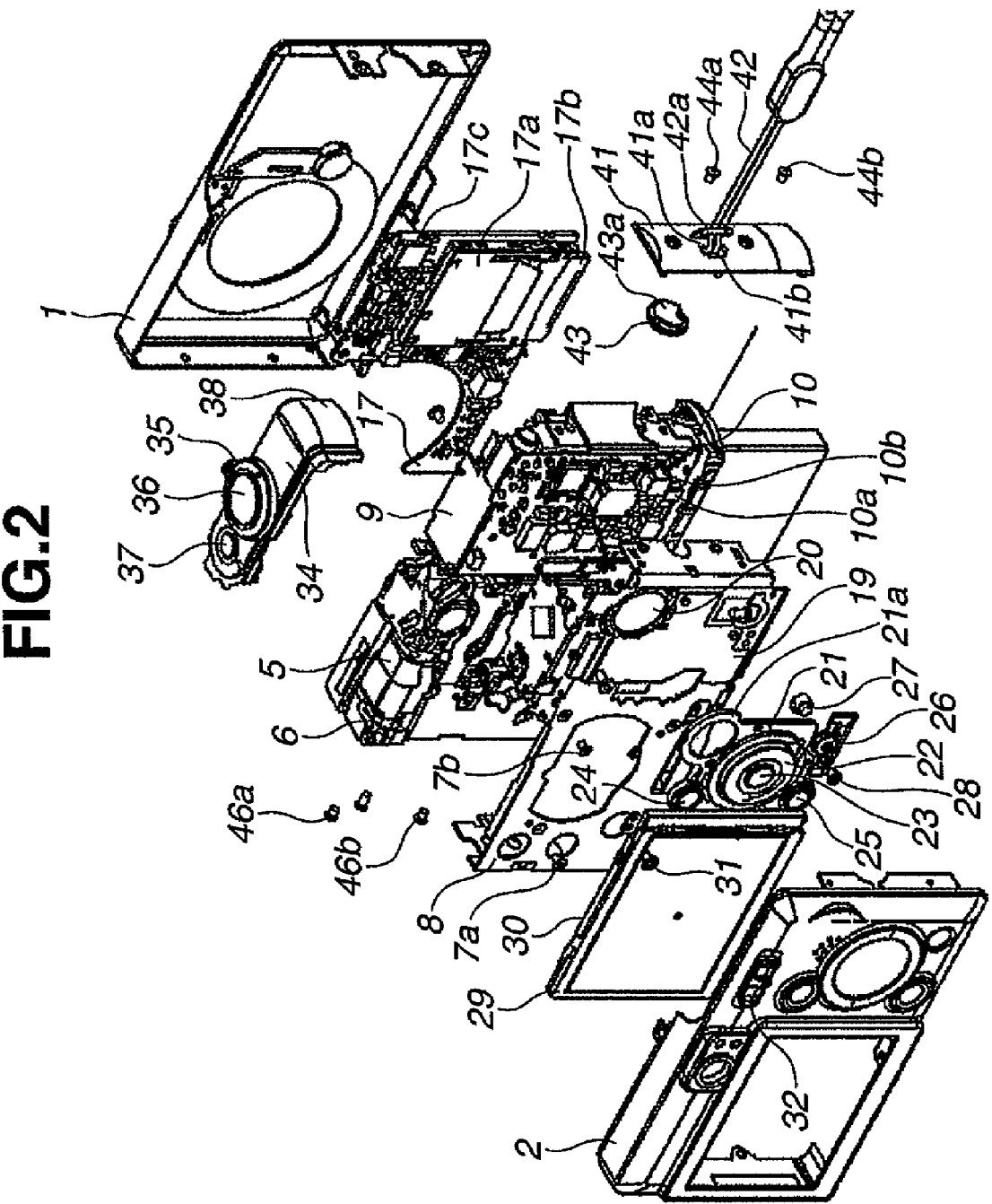
FIG. 2 is an exploded perspective view showing the camera according to the first embodiment of the present invention viewed from the rear side.

FIG. 1 is an exploded perspective view of a camera according to one embodiment of the present invention, where the view is from front side of the camera. FIG. 2 is an exploded perspective view of the camera according to one embodiment of the present invention, where the view is from the rear side of the camera. Referring to these drawings, a front cover 1 covers the front side of the camera, and a rear cover 2 covers the rear side. A lens barrel unit 3 holds an image taking lens and the like in which a finder unit 4, a zoom motor 5 that rotates the lens barrel unit, and a gear unit 6 are integrally assembled, and is fixed to a base member 8 by screws 7a, 7b, and 7c.

The battery case 9 holds a battery 51, which is fixed to the base member 8 with screws 11a and 11b inserting the power source board unit 10 in between.

Reference numeral 12 denotes a strobe unit on the upper part of which a strobe flash unit 13 is arranged. A flexible board 14 for a strobe that mounts to a strobe circuit thereon is attached to a frame portion of the strobe unit 12 which extends to a lower part. A strobe capacitor 15 is also fixed to the frame portion of the strobe unit 12. The strobe unit 12 is disposed in front of the zoom motor 5 and the gear unit 6 attached to the lens barrel unit 3, which is fixed to the base member 8 by a screw 16 in the side portion. A width of the strobe flash unit 13 is approximately equal to the combined width of the gear unit 6 and the zoom motor 5 disposed in its back, accordingly they can be arranged with no wasted space.

Reference numeral 17 denotes a main board on which the CPU, the memory, the image processing LSI, and the like, are mounted. A slot 17a of the SD memory card 17b (external memory) and a USB connector 17c are mounted on the rear side of the main board 17. The main board 17 is fixed to the base member 8 and the battery case 9 by screws 18a, 18b, and 18c. Reference numeral 19 denotes an operation flexible board on which a release switch, a power switch, and the like are mounted. Reference numeral 20 denotes a speaker which terminal is soldered to one edge of the operational flexible board 19.

An operation button base 21 is made of silicon rubber to which the operation buttons such as cross key 22, center key 23, or push buttons 24 and 25 are attached. At the rear side of this operation button base 21, dome-shaped metallic plates (metal domes) are attached to positions corresponding to each of the buttons stuck on the operation button base 21. By pressing each operation button, the metal dome is brought into contact with a pattern on the operation flexible plate 19 and energization is performed. Moreover, a portion 21a of the operation button base 21 covers an edge of the speaker 20 and plays a role of the cushion by filling in a gap between the speaker 20 and the rear cover 2. Reference numeral 26 denotes an illumination button to which a light guiding member 27 is attached at the center.

An LCD holder 30 holds an LCD panel 29 and a back light (not shown), and is fixed to the base member 8 by a screw 31. A mode switching button 32 switches the operation mode of the camera to a still picture image taking mode, a moving picture image taking mode, or a replaying mode by sliding in a right and left direction as shown in FIG. 2. The mode switching button 32 is configured to be capable of moving from side to side, sandwiching the rear cover 2 together with a fixing board 33 located at its rear side. In addition, the mode switching button 32 is configured to enable the switch unit to perform switching with a notch 33a, which holds an arm of the mode switching button 32 mounted on the operation flexible board 19.

A button holding member 34 holds a zoom dial 35, a release button 36, and a power button 37 and is disposed above the battery case 9 across the operational flexible board 19. Moreover, the button holding member 34 has on its side a USB connector 17c and a jack storing unit that stores a jack (not shown) for images and sounds, as well as a pull-out type jack cover 38 that covers them.

Reference numeral 41 denotes a strap attaching member of a rectangular shape with a round surface to which a strap 42 is attached. From the standpoint of design and strength, the strap attaching member 41 is formed by die casting. The strap attaching member 41 has an opening 41b. An end of the strap ring 42 is wounded around a rod-shaped unit 41a which crosses nearly the center of the opening 41b. The strap attaching member 41 has screw holes punched approximately in an elongated direction of the rod-shaped unit 41a. The screw holes are used to mount the strap attaching member 41 on the base member 8 by the screws 44a and 44b. Thereby, the force pulling the strap attaching member 41 caused by the strap 42 is efficiently transmitted to the camera body.

Reference numeral 43 denotes an inner member having an arc-shaped (or hemisphere) recess 43a. The inner member 43 is fitted to the opening unit 41b of the strap attaching member 41 from the rear side. When the inner member 43 is fitted to the strap attaching member 41, the recess 43a and the opening 41b form a hole under the rod-shaped unit 41a which guide an end 42a of the strap 42 from one side of the opening 41b to the other side. Reference numeral 45 denotes a tripod securing member where a screw is cut to secure a tripod.

Figure 3:
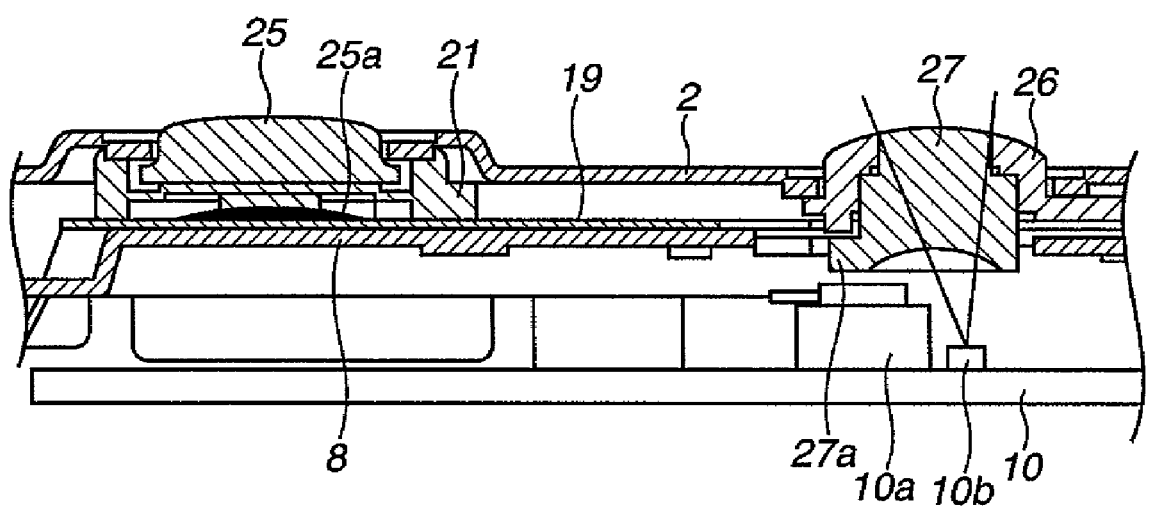
FIG. 3 is a drawing showing a cross sectional view of the illumination button and its surroundings according to the first embodiment.

FIG. 3 shows the cross sectional view of the illumination button 26 and its surroundings. As shown in FIG. 3, the operational flexible board 19 and the operation button base 21 are sandwiched and held by the base member 8 and the rear cover 2. A push button 25 is attached on top of the operation button base 21, and a metal dome 25a adheres on its rear side. Other push buttons 24, the cross key 22, and the center key 23 are similarly arranged (not shown in FIG. 3). The illumination button 26 is arranged by notching a part of the operational flexible board 19. A tactile switch 10a is mounted on the power source board unit 10 located further inside the camera than the flexible board 19 and is configured to be pressed by an edge 27a of the light guiding member 27. An LED 10b is disposed at a side of the tactile switch 10a, and a light emitted from the LED 10b is guided to the surface of the illumination button 26 through the light guiding member 27. Although the LED 10b is located slightly off-center of the illumination button 26, it is capable of irradiating the surface of the illumination button 26 uniformly and efficiently because of its position with respect to the surface of the illumination button 26. Moreover, since the tactile switch 10a does not require a large mounting area, the center of the tactile switch 10a can be placed close to the center of the illumination button 26, thus keeping the LED 10b close to the center of the illumination button 26. A base of the illumination button 26 is fixed to the base member 8 by a screw 28.

Second Exemplary Embodiment

Figure 4:
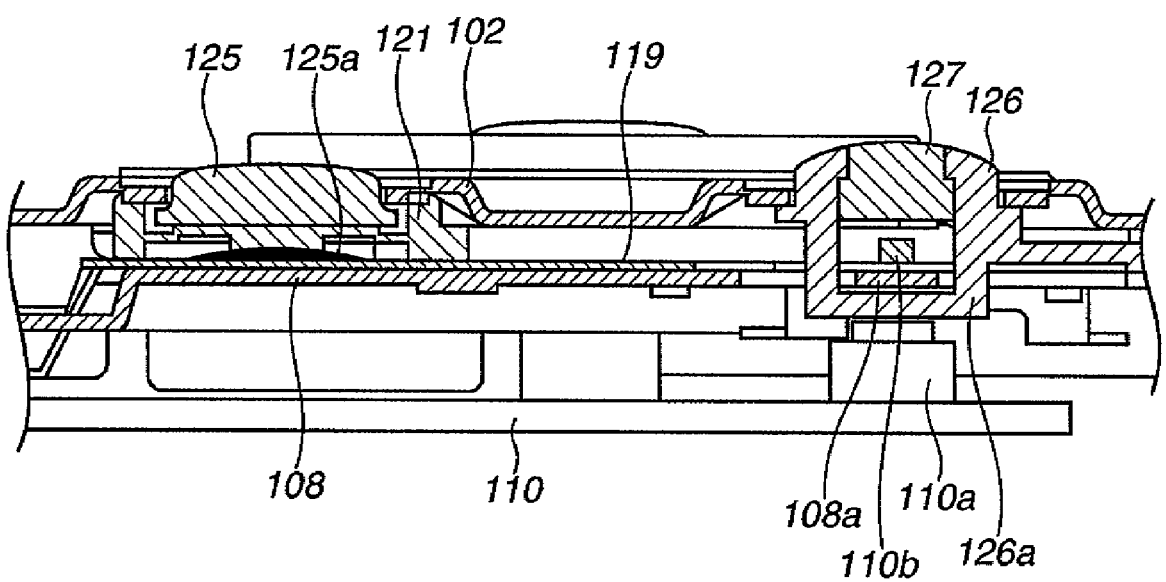
FIG. 4 is a drawing showing a cross sectional view of the illumination button and its surroundings according to the second embodiment.

FIG. 4 shows the cross sectional view of the illumination button 126 and its surroundings according to the second embodiment. All other elements of the camera have the same configuration as shown in FIGS. 1 and 2. As shown in FIG. 4, the operational flexible board 119 and the operation button base 121 are sandwiched and held by the base member 108 and the rear cover 102. A push button 125 is attached on the operation button base 121, and a metal dome 125a adheres to its rear side. The illumination button 126 has a U-shaped switch (SW) pressing unit 126a, and a light guiding member 127 is attached to the button 126 center. A tongued unit 108a of the base member 108 is inserted into the inside of the switch pressing unit 126a. An LED 110b is disposed immediately below the light guiding member 127. Moreover, a tactile switch 110a is mounted on the power source board unit 110 which is located further inside the camera than the operational flexible board 119, and configured to be pressed by the switch pressing unit 126a. A light emitted from the LED 110b is guided to the surface of the illumination button 126 through the light guiding member 127 in an upward direction from the tactile switch 110a.

According to the first embodiment, a plurality of buttons is disposed in the vicinity of one face of the camera, and a part of the buttons is illuminated with light from a light source, such as an LED, from behind the buttons so as to allow them to light up. In that case, if the light source is disposed further inside than the switches of the buttons, and the part of the button surfaces is illuminated using the light guiding member, the buttons can be illuminated efficiently and with good appearance since the light source is located almost immediately below the button.

Moreover, according to the second embodiment, a switch is located further inside than the light source, and the light source is placed between the switch and the light guiding member. Accordingly, the buttons can be illuminated efficiently and with good appearance.

Further, according to the present embodiments, only the center of the illumination button 26 (126) is illuminated so that the light guiding member is configured as a separate member. However, the illumination button 26 (126) and the light guiding member 27 (127) may be integrally molded and other unnecessary surfaces may be screened with a paint, and the like, or the whole button 26 (126) may be illuminated while it is integrally molded.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed:

1. An image capture device comprising:
   an image capture unit;
   a display unit configured to display an image obtained from the image capture unit, wherein the display unit is mounted on a first side of a rear portion of the image capture unit;
   a first operation button mounted on a second side of the rear portion of the image capture unit;
   a second operation button having a light guided member, wherein the second operation button is mounted on the second side of the rear portion of the image capture unit;
   a first board mounted with a first switch corresponding to the first operation button, wherein a portion of the first board is notched;
   a second switch corresponding to the second operation button, wherein the second switch is mounted below the notched portion of the first board; and
   a light source mounted below the light guiding member and the notched portion of the first board.

2. The image capture device according to claim 1, wherein the second side of the rear portion of the image capture device is located opposite the first side of the rear portion of the image capture device.

3. The image capture device according to claim 1, wherein the second switch and the light source are mounted on a second board different from the first board.

4. The image capture device according to claim 1, wherein the light source is located between the second operation button and the second switch.

* * * * *